(12) United States Patent
Cheng et al.

(10) Patent No.: US 10,382,115 B2
(45) Date of Patent: Aug. 13, 2019

(54) SYSTEM AND METHOD FOR HYBRID BEAMFORMING DIVERSITY

(71) Applicant: Futurewei Technologies, Inc., Plano, TX (US)

(72) Inventors: Qian Cheng, Aurora, IL (US); Weimin Xiao, Hoffman Estates, IL (US); Jialing Liu, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 54 days.

(21) Appl. No.: 15/199,301

(22) Filed: Jun. 30, 2016

(65) Prior Publication Data

US 2018/0006706 A1 Jan. 4, 2018

(51) Int. Cl.
*H04B 7/08* (2006.01)
*H04B 7/06* (2006.01)
(Continued)

(52) U.S. Cl.
CPC ......... *H04B 7/0868* (2013.01); *H04B 7/0617* (2013.01); *H04B 7/0626* (2013.01); *H04B 7/0695* (2013.01); *H04B 7/088* (2013.01); *H04W 72/042* (2013.01); *H04W 72/0413* (2013.01); *H04W 72/1289* (2013.01)

(58) Field of Classification Search
CPC .. H04B 7/0868; H04B 7/0626; H04B 7/0617; H04W 72/1289; H04W 72/0413; H04W 72/042
See application file for complete search history.

(56) References Cited

U.S. PATENT DOCUMENTS

2006/0145919 A1   7/2006  Pleva et al.
2009/0322613 A1*  12/2009 Bala ................ H04B 7/022
                                             342/373
(Continued)

FOREIGN PATENT DOCUMENTS

CN       1540903 A      10/2004
WO    2015088419 A1      6/2015

OTHER PUBLICATIONS

3GPP TSG RAN WG1 Meeting #60 R1-101300, "System results for HSUPA beam forming diversity with 3D antennas," Ericsson et al., Feb. 22-26, 2010, 13 pages.

*Primary Examiner* — Alex Skripnikov
*Assistant Examiner* — Sharmin Chowdhury
(74) *Attorney, Agent, or Firm* — Slater Matsil, LLP

(57) ABSTRACT

A system and method for hybrid beamforming diversity includes a method by a UE with one or more receive antenna ports, each of the receive antenna ports associated with a plurality of receive beam ports, the method comprising receiving, by the UE, information from a network indicating configurations of one or more transmit antenna ports, each of the transmit antenna ports associated with a plurality of transmit beam ports, the information further indicating a plurality of reference signals, receiving, by the UE, a subset of the reference signals, measuring, by the UE, receive signal quality for each of the subset of the reference signals, determining, by the UE, a selected receive beam port for each of the receive antenna ports, deriving, by the UE, one or more reporting sets, transmitting, by the UE, the one or more reporting sets to the network, and receiving, by the UE, a data transmission.

22 Claims, 9 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2013/0039291 A1* | 2/2013 | Blankenship | H04L 5/001 |
| | | | 370/329 |
| 2013/0113658 A1 | 5/2013 | Adams et al. | |
| 2015/0282122 A1 | 10/2015 | Kim | |
| 2015/0326297 A1 | 11/2015 | Petersson et al. | |
| 2016/0028519 A1* | 1/2016 | Wei | H04B 7/0456 |
| | | | 375/267 |
| 2016/0212649 A1* | 7/2016 | Chen | H04W 24/10 |
| 2016/0337016 A1* | 11/2016 | Capar | H04B 7/0456 |
| 2016/0337056 A1* | 11/2016 | Frenne | H04B 7/0695 |
| 2017/0264414 A1* | 9/2017 | Froberg Olsson | H04L 5/0051 |
| 2018/0287722 A1* | 10/2018 | Takano | H04W 16/28 |

* cited by examiner

```
Reporting set 1:
{
    Tx antenna port 0:
        Tx beam port i;
        Tx beam port j;
    Tx antenna port 1:
        Tx beam port j;
}

Reporting set 2:
{
    Tx antenna port 3:
        Tx beam port k;
}
```

SYSTEM AND METHOD FOR HYBRID BEAMFORMING DIVERSITY

TECHNICAL FIELD

The present invention relates generally to radio frequency (RF) transmissions in a network, and in particular embodiments, to a system and method for hybrid beamforming diversity.

BACKGROUND

Transmitted signals, and particularly millimeter wave (mmWave) signals, can be blocked by obstructions such as a human hand. Blocked transmission paths can cause unreliable communication in wireless networks. Transmission path obstructions may be avoided by changing the beam used to perform the transmission at the base station. Hybrid beamforming can be used in mmWave communication to direct signals around transmission path obstructions, which can reduce signal path loss in high-frequency bands. Hybrid beamforming splits precoding and combining of signals between the baseband and RF layers of the transmitter.

In hybrid beamforming, a transmission is divided into transmission groups, with each transmit group including one transmit antenna port. Each transmit antenna port may transmit using one of several possible transmit beam ports. A user equipment (UE) may select a transmit beam port during a defined beam scanning opportunity in the network. The transmit beam ports for each transmit antenna port at the base station may be used to sequentially transmit reference signals during a beam scanning opportunity. The UE scans for signals from all transmit beam ports from the base station during a beam scanning opportunity and indicates a preferred transmit beam port.

SUMMARY OF THE INVENTION

Technical advantages are generally achieved by embodiments of this disclosure, which describe a system and method for hybrid beamforming diversity.

In accordance with an embodiment, a method by a UE with one or more receive antenna ports, each of the receive antenna ports associated with a plurality of receive beam ports is provided. The method includes receiving, by the UE, information from a network indicating configurations of one or more transmit antenna ports, each of the transmit antenna ports associated with a plurality of transmit beam ports, the information further indicating a plurality of reference signals, each of the reference signals associated with one of the transmit beam ports for the transmit antenna ports, receiving, by the UE, a subset of the reference signals, measuring, by the UE, receive signal quality for each of the subset of the reference signals, determining, by the UE, a selected receive beam port for each of the receive antenna ports according to the receive signal quality measured, deriving, by the UE, one or more reporting sets, the one or more reporting sets corresponding to one of the receive antenna ports, each of the reporting sets indicating one or more selected transmit beam ports for the receive antenna port, the one or more reporting sets derived according to the receive signal quality measured, transmitting, by the UE, the one or more reporting sets to the network, and receiving, by the UE, a data transmission from the selected transmit beam ports using the selected receive beam port for each of the receive antenna ports.

In accordance with an embodiment, a method by a network with one or more transmit antenna ports, each of the transmit antenna ports associated with a plurality of transmit beam ports is provided. The method includes sending, by the network, information to a UE indicating configurations of the transmit antenna ports, the information further indicating a plurality of reference signals, each of the reference signals associated with one of the transmit beam ports for the transmit antenna ports, transmitting, by the network, the plurality of reference signals, receiving, by the network, one or more reporting sets from the UE, each of the one or more reporting sets indicating one or more of the transmit beam ports, selecting, by the network, one or more selected transmit beam ports for each one of the reporting sets, each of the selected transmit beam ports having different transmit antenna ports, and transmitting, by the network, data using the selected transmit beam ports.

In accordance with an embodiment, a user equipment (UE) with one or more receive antenna ports, each of the receive antenna ports associated with a plurality of receive beam ports is provided. The UE includes a processor, and a non-transitory computer-readable storage medium storing a program to be executed by the processor, the program including instructions to receive information from a network indicating configurations of one or more transmit antenna ports, each of the transmit antenna ports associated with a plurality of transmit beam ports, the information further indicating a plurality of reference signals, each of the reference signals associated with one of the transmit beam ports for the transmit antenna ports, receive a subset of the reference signals, measure receive signal quality for each of the subset of the reference signals, determine a selected receive beam port for each of the receive antenna ports according to the receive signal quality measured, derive one or more reporting sets, the one or more reporting sets corresponding to one of the receive antenna ports, each of the reporting sets indicating one or more selected transmit beam ports for the receive antenna port, the one or more reporting sets derived according to the receive signal quality measured, transmit the one or more reporting sets to the network, and receive a data transmission from the selected transmit beam ports using the selected receive beam port for each of the receive antenna ports.

In accordance with an embodiment, a network with one or more transmit antenna ports, each of the transmit antenna ports associated with a plurality of transmit beam ports is provided. The network includes a processor, and a non-transitory computer-readable storage medium storing a program to be executed by the processor, the program including instructions to send information to a UE indicating configurations of the transmit antenna ports, the information further indicating a plurality of reference signals, each of the reference signals associated with one of the transmit beam ports for the transmit antenna ports, transmit the plurality of reference signals, receive one or more reporting sets from the UE, each of the one or more reporting sets indicating one or more of the transmit beam ports, select one or more selected transmit beam ports for each one of the reporting sets, each of the selected transmit beam ports having different transmit antenna ports, and transmit data using the selected transmit beam ports.

BRIEF DESCRIPTION OF THE DRAWINGS

For a more complete understanding of the present invention, and the advantages thereof, reference is now made to the following descriptions taken in conjunction with the accompanying drawing, in which:

FIG. 7 illustrates example reporting sets;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
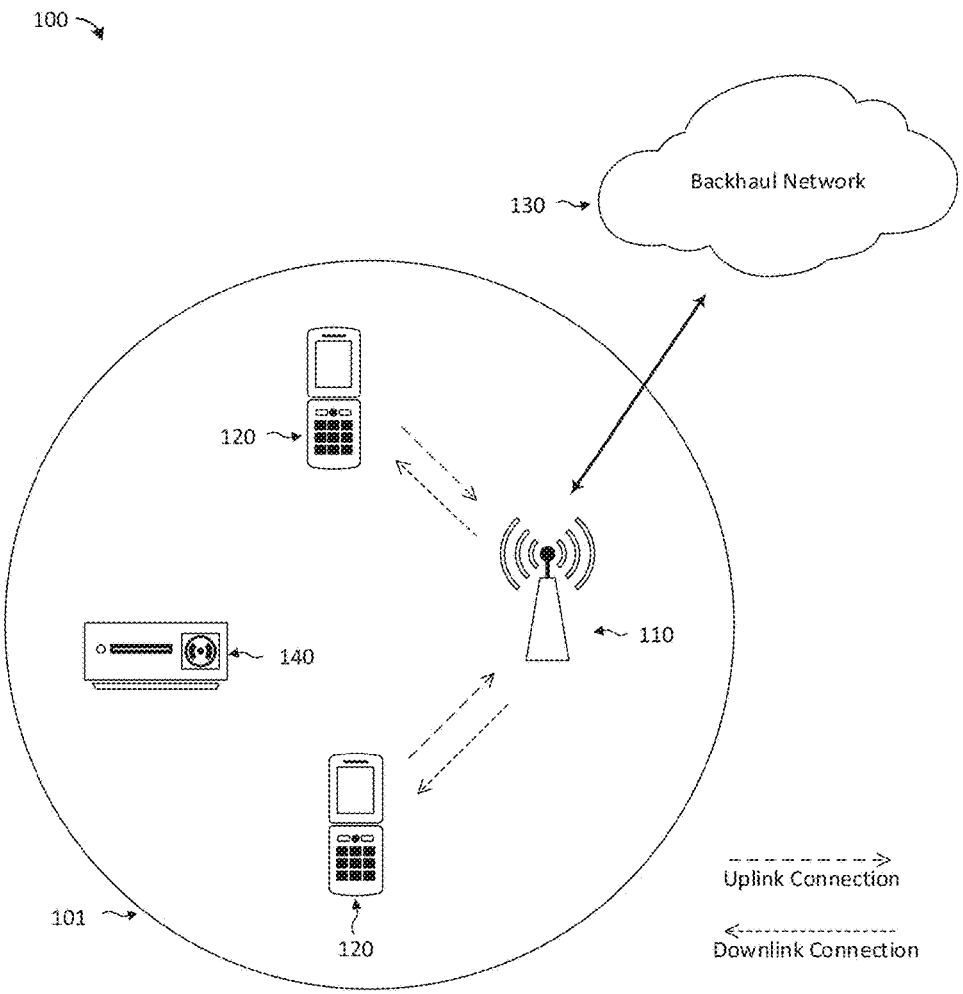
FIG. 1 illustrates a network for communicating data.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In mmWave networks, UEs and base stations may use beamforming such that the base station and the UE communicate over a pair of beams that meet a desired criterion, e.g., low noise levels, high throughput levels, etc. As used herein, the term "beam" refers to a set of beamforming weights (e.g., amplitude/phase shifts for antenna elements of a phased array antenna) that are used for directional signal transmission and/or reception. Beamforming in mmWave systems may typically be performed by both the base station and the UE in order to achieve commercially acceptable levels of throughput and range over higher carrier frequencies. Accordingly, transmission schemes for mmWave systems may need to identify beams to be used for performing transmission by the base station.

Traditional mmWave configuration schemes may evaluate all combinations of beam directions between the set of beam directions available to the UE and the set of beam directions available to the base station. By way of example, if nine beam directions are in the set of beam directions available to the base station and six beam directions are available to the UE, then fifty-four combinations would be evaluated according to traditional beamforming configuration schemes. Evaluating so many different combinations of beam directions may introduce significant overhead and latency into the beamforming configuration process.

Aspects of this disclosure utilize beam diversity to achieve increased transmission reliability and beam scanning performance. In embodiments, a base station transmits several reference signals generated with different transmit antenna ports and transmit beam ports to a UE. The UE receives the reference signals using receive beam ports supported by the UE, and derives a report from the reference signals according to signal quality or interference levels encountered by each transmit/receive beam port. The report indicates, as a pair, the transmit antenna ports and transmit beam ports at the base station that transmitted reference signals with acceptable interference levels to the UE. The base station may then select one or more of the transmit antenna/beam pairs from the report for performing transmissions to the UE. Different receive antenna ports at the base station are used for each receive beam port formed at the base station.

Diversification of transmit antenna port selection may increase transmission reliability by allowing the base station and the UE to agree upon multiple transmit antenna and beam ports the base station may transmit with in a redundant manner. Beam scanning is typically performed periodically, but the period for beam scanning can be long, which reduces overhead in a network but also causes a full beam scan to be an expensive operation. By using multiple transmit antenna and beam ports for transmission in a redundant manner, beam switching speed can be improved by avoiding beam scanning when recovering from a blocked transmission path.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
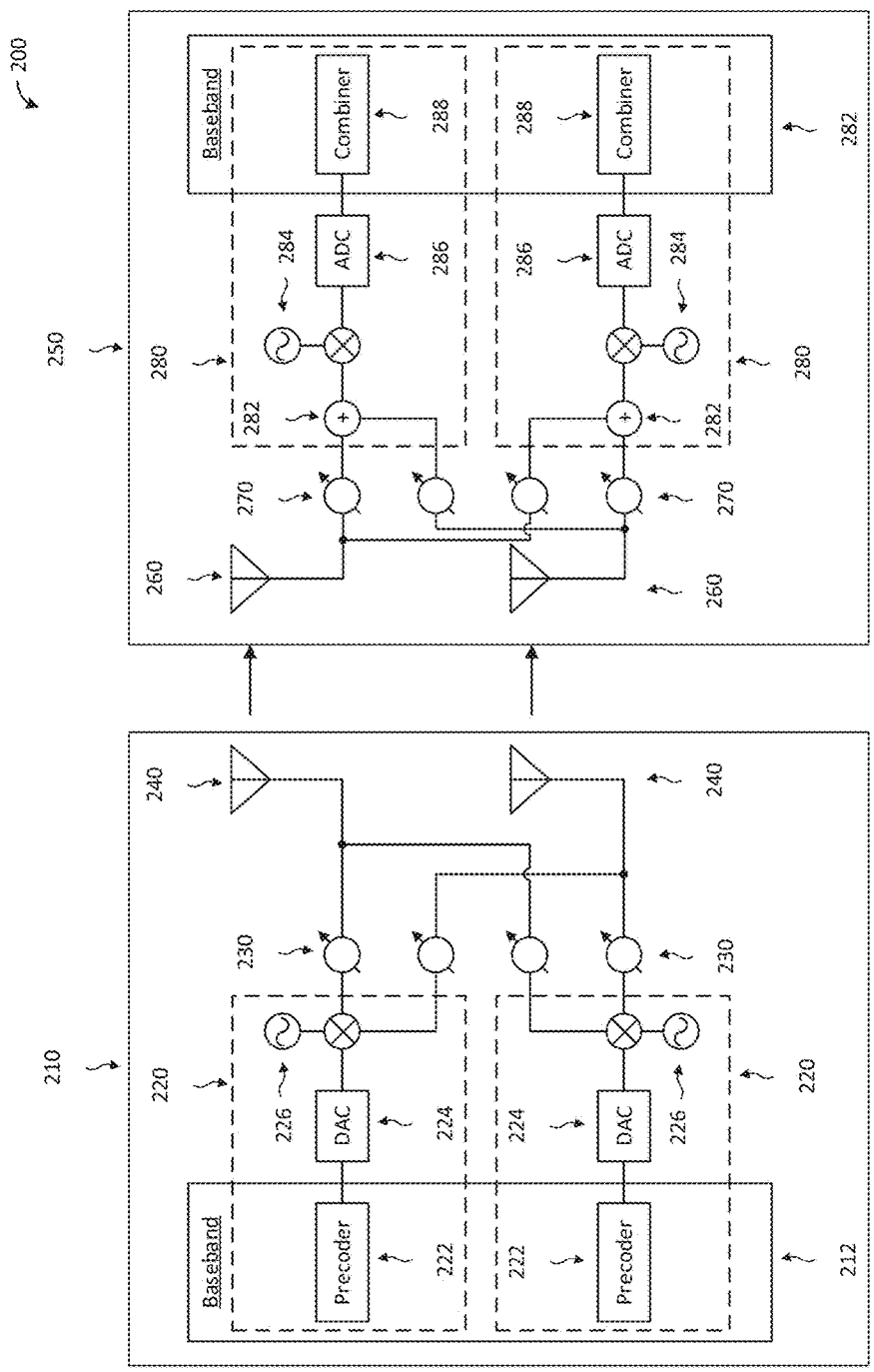
FIG. 2 illustrates a network for transmitting signals with hybrid beamforming.

FIG. 2 illustrates a network 200 for transmitting signals with hybrid beamforming. The network 200 includes a base station 210 and a UE 250. The base station 210 and the UE 250 may be devices that support multiple-input, multiple-output (MIMO) communication.

The base station 210 includes a transmit baseband processor 212, transmit antenna ports 220, phase shifters 230, and antennas 240. The base station 210 may be, e.g., a base station that transmits signals using hybrid beamforming. Each of the transmit antenna ports 220 transmit mmWave signals with the antennas 240 using a transmit beam port selected by the phase shifters 230. The transmit baseband processor 212 manages radio functions in the base station 210.

The transmit antenna ports 220 include precoders 222, digital-to-analog converters (DACs) 224, and modulators 226. The precoders 222 apply independent and appropriate weightings for each data stream to be sent with the antennas 240. The precoders 222 may be included with a baseband in the base station 210 that may be, e.g., a digital signal processor (DSP). Once the precoders 222 produce precoded data streams, the DACs 224 convert each precoded data stream to an analog mmWave signal for transmission. The modulators 226 modulate the analog mmWave signal with a carrier signal. Once the modulated signals are produced, a transmit beam port is selected for each transmit antenna port using the phase shifters 230, and the mmWave signals are transmitted on the antennas 240 using the selected transmit beam port. The antennas 240 may be an array of antennas for transmitting the multiple signals that form the transmit beam ports. Although the precoders 222 are shown as being part of the transmit baseband processor 212, it should be appreciated that other devices could also be part of the transmit baseband processor 212.

The UE 250 includes antennas 260, phase shifters 270, receive antenna port 280, and a receive baseband processor 282. The UE 220 may be, e.g., a user device that receives signals using hybrid beamforming. Each of the receive antenna port 280 decode mmWave signals received with the antennas 260 using a transmit beam port selected by the phase shifters 270. Like the base station 210, the antennas 260 of the UE 250 may be an array of antennas.

The receive antenna port 280 include summing units 282, demodulators 284, analog-to-digital converters (ADCs) 286, and combiners 288. The summing units 282 sum signals received by each of the antennas 260. The demodulators 284 extract the analog mmWave signal from the carrier signal. The ADCs 286 convert each analog mmWave signal to a data stream for decoding. The combiners 288 remove the weightings from each data stream decoded by the ADCs 286 and equalize the data streams. The combiners 288 are part of a baseband in the UE 250 that may be, e.g., a digital signal processor (DSP). The quantity of receive antenna port 280 in the UE 250 may be different than the quantity of transmit antenna ports 220 in the base station 210. The receive baseband processor 282 manages radio functions in the UE 250, and may include the combiners 288 and/or other devices.

Figure 3:
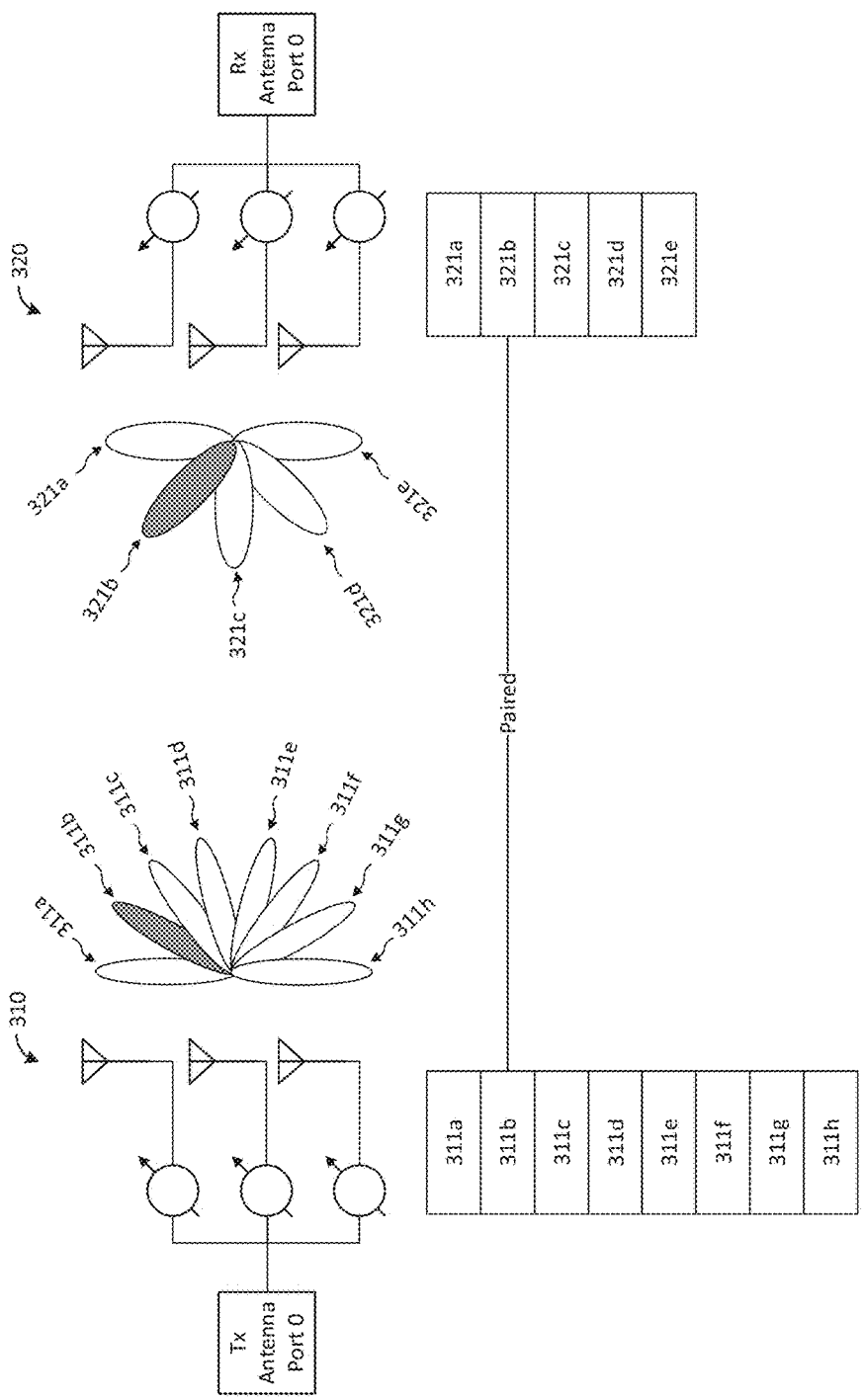
FIG. 3 illustrates a diagram of a hybrid beamforming transmission scheme.

FIG. 3 illustrates a diagram of a hybrid beamforming transmission scheme, as may be performed in an mmWave system. As shown, the base station 310 cycles through all of the transmit beam directions 311a-311h in the set of transmit beam directions 311 available to the base station 310 when performing transmissions using hybrid beamforming. The UE 320 also cycles through all of the receive beam directions 321a-321e in the set of receive beam directions 321 available to the UE 320 when receiving transmissions using hybrid beamforming. Each combination of beam directions between the set of transmit beam directions 311 available to the base station 310 and the set of receive beam directions 321 available to the UE 320 are evaluated. For example, if the base station 310 can transmit over one transmit beam direction at a time, and the UE 320 can receive over one receive beam direction at a time, then a total number of 40 transmit-receive beam pairs are possible in the example shown, and therefore 40 possible pairs need to be evaluated during a beam scanning opportunity. Once the pairs have been evaluated, a transmit beam and a receive beam are paired. In the example illustrated in FIG. 3, the transmit beam 311b and the receive beam 321b are paired.

Figure 4:
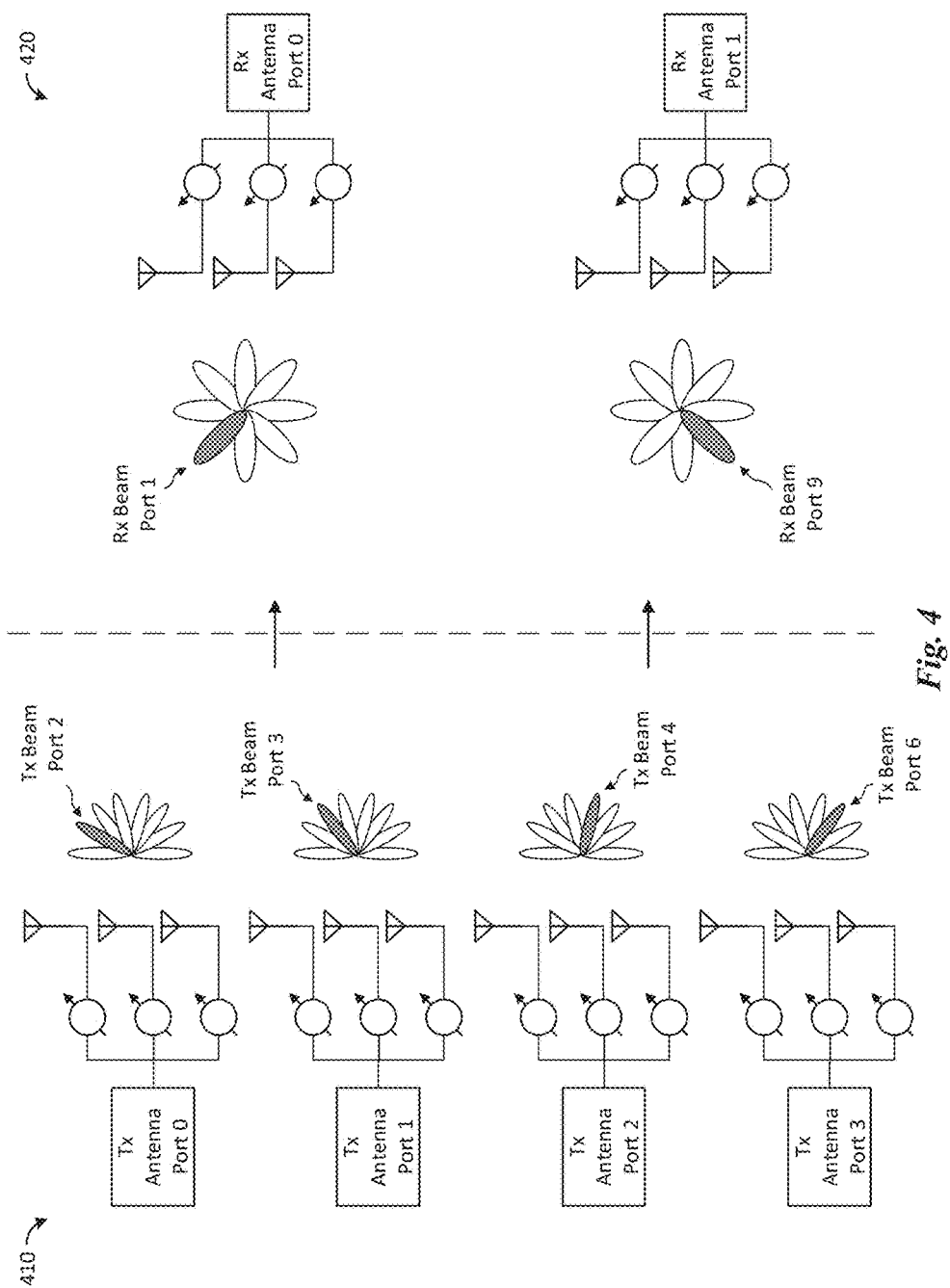
FIG. 4 illustrates a network for transmitting signals with hybrid beamforming.

FIG. 4 illustrates a network for transmitting signals with hybrid beamforming. The network includes a base station 410 and a UE 420. The base station 410 and the UE 420 may be devices that support multiple-input, multiple-output (MIMO) communication. The base station 410 includes transmit antenna ports 0-3. The UE 420 includes receive antenna ports 0-1. When performing transmissions using hybrid beamforming, the base station 410 divides the transmission into several transmit groups, with each of the transmit groups corresponding to transmit antenna ports at the base station 410. Each transmit group is then transmitted using a transmit beam port for the transmit group. In the example illustrated in FIG. 4, the base station 410 is transmitting with the following transmit antenna/beam port pairs: antenna port 0/beam port 2, antenna port 1/beam port 3, antenna port 2/beam port 5, and antenna port 3/beam port 6. Likewise, when receiving transmissions using hybrid beamforming, the UE 420 receives the transmission with several receive beam ports corresponding to receive antenna ports 0 and 1. In the example illustrated in FIG. 4, the UE 420 is receiving with the following receive antenna/beam port pairs: antenna port 0/beam port 1, antenna port 1/beam port 9.

Figure 5:
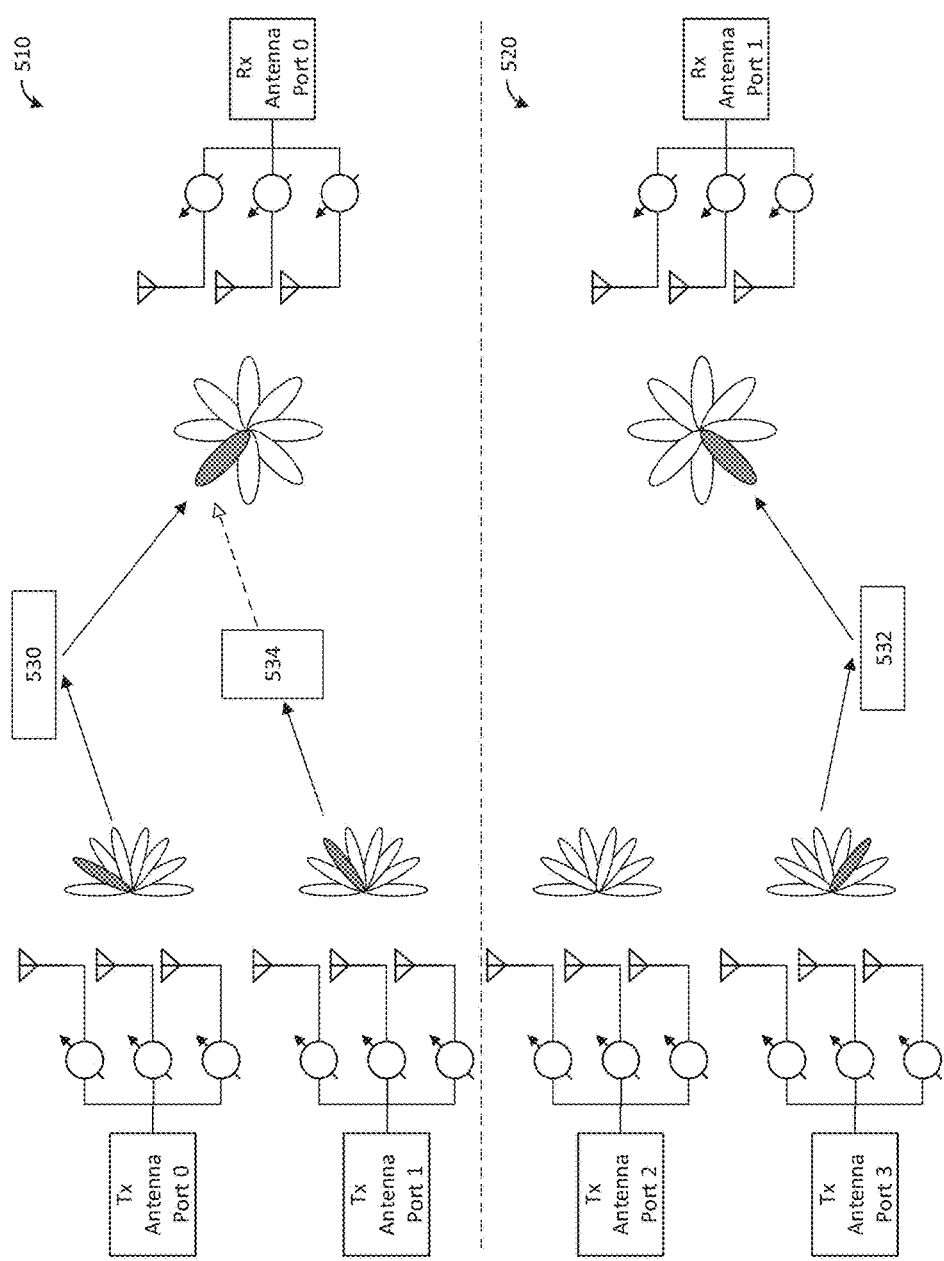
FIG. 5 illustrates the network when transmitting signals with hybrid beamforming.

FIG. 5 illustrates the network when transmitting signals with hybrid beamforming. The base station 410 is shown performing a transmission to the UE 420 with two sets of transmit/receive beam port pairs: a first set 510, and a second set 520. Each set may be used to transmit data to a different receive antenna port of the UE 420. In some embodiments, the data sent to each receive antenna port may be data of a same transport block. For example, the data sent to each receive antenna port may be different redundant versions of the same transport block. In some embodiments, a set may use multiple transmit beam ports for transmission, and the transmitted data may be encoded. For example, data is transmitted to a receive beam port of the UE 420 in the first set 510 using two transmit beam ports. The transmit beam ports transmit jointly in different spatial directions. The transmission may be encoded with, e.g., the Alamouti algorithm. In some embodiments, a set may include one transmit beam port. For example, data is transmitted to a receive beam port of the UE 420 in the second set 520 using one transmit beam port.

As further shown in FIG. 5, obstructions 530, 532, 534 can reflect or block wireless signals. Signals transmitted from the base station 410 in both the first set 510 and the second set 520 reflect off the obstructions 530, 532 before ultimately reaching the UE 420. Likewise, other signals transmitted with the first set 510 are blocked by the obstruction 534. The obstruction 534 may be anything between the base station 410 and the UE 420. For example, the obstruction 534 may be a human hand holding the UE 420 during operation. The obstructions 530, 532, 534 may be movable obstructions that block previously optimal signal paths. For example, the beam port pairs that form the first set 510 may have been optimal beam port pairs at the time of the last beam scanning opportunity, but motion of the UE 420 or changes in the positions of obstructions such as the obstruction 534 may change the operating environment such that that the current beam port pairs in the first set 510 are no longer optimal. Beam scanning opportunities can be spaced apart by a relatively long time period, and beam scanning itself is an expensive operation. As a result, such techniques can result in a long recovery time if the strongest beams are blocked during operation.

Diversifying beam selection for transmit/receive beam port pairs may improve reliability and reduce beam scanning time by reducing the chances that all transmission paths will be blocked by a single obstruction. Beam diversity is accomplished by attempting to select transmit beam ports at the base station 410 to pair with receive beam ports at the UE 420 such that the transmit beam ports have different transmit antenna ports at the base station. Beam diversification can be coordinated between the base station and the UE through several mechanisms. In some embodiments, diversification is coordinated using channel state information (CSI) reporting.

Figure 6:
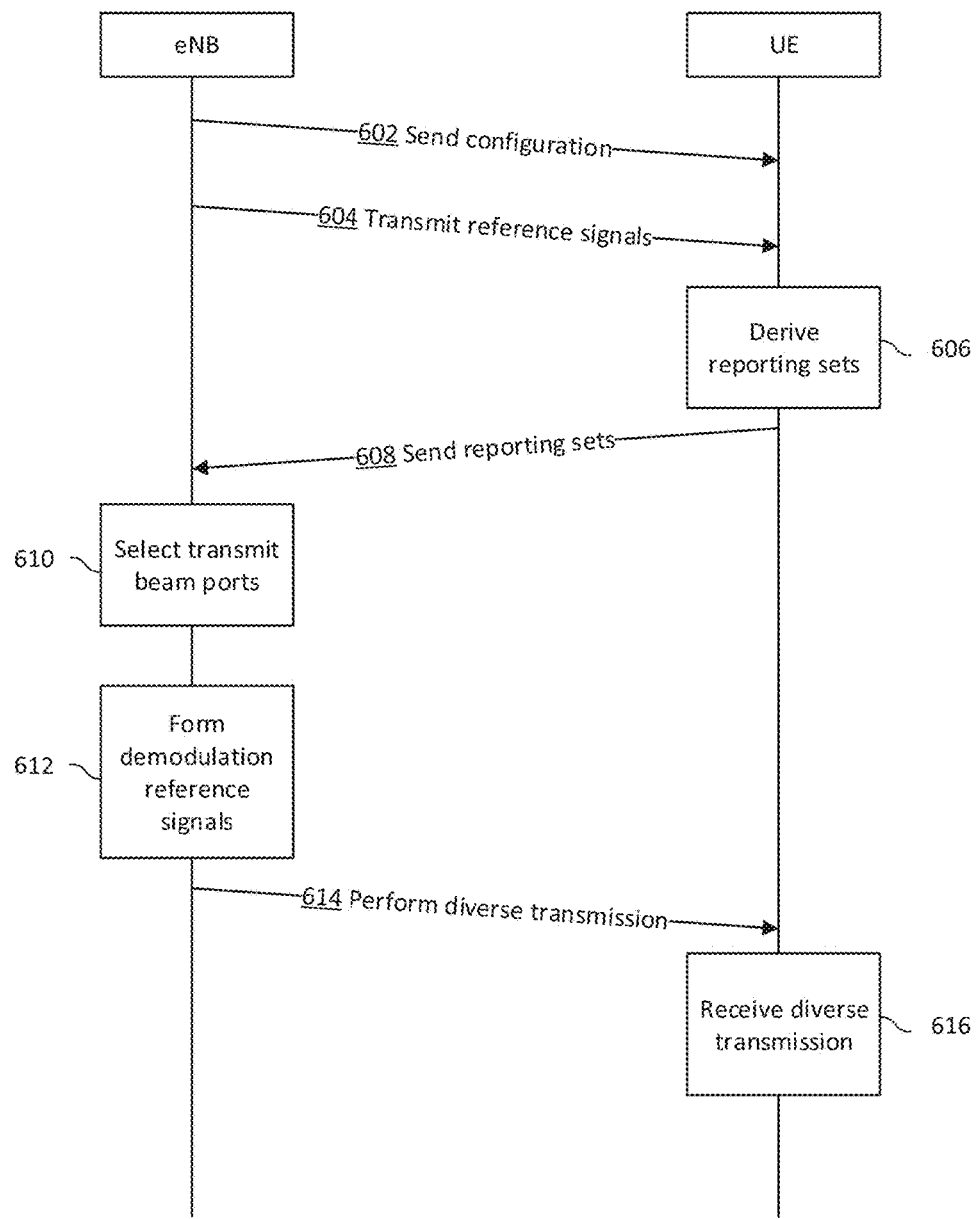
FIG. 6 illustrates a beam diversification method.

FIG. 6 illustrates a beam diversification method 600. The beam diversification method 600 is indicative of operations occurring in a network when a base station requests that a UE perform beam scanning and transmit a report that will aid the base station in performing a transmission using diverse hybrid beamforming. A report includes one or more reporting sets, with each reporting set including one or more transmit antenna/beam port pairs.

First, the base station sends a configuration to the UE that instructs the UE to begin performing beam scanning and reporting (step 602). The configuration indicates configurations of one or more transmit antenna ports at the base station, and includes information identifying reference signals that will be transmitted to the UE. The configuration may include one or more parameters. In some embodiments, the parameters include a maximum quantity of reporting sets (shown below in FIG. 7) for a report. In some embodiments, the configuration may be a CSI reporting configuration and the report may be a CSI report, although it should be appreciated that any signaling mechanism could be used to request and receive the report.

Next, the base station transmits beam scanning reference signals to the UE (step 604). The beam scanning reference signals are sequentially transmitted by each transmit antenna port at the base station, using each transmit beam port for each transmit antenna port. For example, if the base station has 4 transmit antenna ports, with each transmit antenna port having 4 transmit beam ports, then a total of 16 reference signals are transmitted by the base station. While the beam scanning reference signals are being transmitted, the UE attempts to receive them by sequentially scanning with each receive beam port for each receive antenna port at the UE. The UE determines the transmit antenna and beam port at the transmitter of any signals that have high interference levels.

Next, the UE derives reporting sets for the received reference signals (step 606). The reporting sets are derived according to the receive beam ports that received each reference signal, and the interference levels for each received signal at each receive beam port. Continuing the example above, if a UE has two receive beam ports, then for the 16 transmitted reference signals, the UE must evaluate 32 different transmit/receive combinations. Each reporting set specifies one or more pairs of transmit antenna and beam ports at the base station that can be paired with a receive beam port. The transmit antenna/beam port pairs may be specified with, e.g., integer numbers specifying the indexes of the transmit antenna port and transmit beam port at the base station. In some embodiments, one or more reporting sets indicate transmit antenna/beam port pairs to exclude from transmissions. Included or excluded transmit antenna/beam port pairs may be based on the pair having an interference level below or above a predetermined threshold, respectively.

Next, the UE transmits the report, including the reporting sets, to the base station (step 608). In embodiments where the base station specified a maximum quantity of reporting sets for the report, the quantity of reporting sets derived by the UE is less than or equal to that maximum quantity.

Next, the base station receives the report and selects transmit antenna/beam port pairs for each reporting set in the report (step 610). The transmit antenna/beam port pairs may be selected using several techniques. If a reporting set indicates more than one transmit antenna/beam port pair, then the base station randomly selects two transmit antenna/beam port pairs that have different transmit antenna ports. For example, if the base station selected a first antenna/beam port pair with an antenna port index of 0, the base station randomly selects a second antenna/beam port pair with an antenna port index other than 0. Selecting different antenna ports for a set diversifies the beam selection, which may improve reliability of transmissions on that set. If a reporting set only indicates one transmit antenna/beam port pair, then that pair is selected for the set. In some embodiments, the base station selects the transmit antenna/beam port pairs for each reporting set such that none of the selected pairs have the same antenna port index.

Next, the base station forms demodulation reference signal ports using the selected transmit antenna/beam port pairs from each reporting set (step 612). Each demodulation reference signal port formed for a reporting set is scrambled with a different scrambling sequence. Reference signal ports are used to transmit reference signals to the UE, which contain a reference point for the UE to determine downlink power. If only one transmit antenna/beam port pair was selected for a reporting set, then one demodulation reference signal port is formed for the selected pair. If two one transmit antenna/beam port pairs were selected for a reporting set, then a demodulation reference signal port is formed for each of the two selected pairs. In such scenarios, the two demodulation reference signal ports may be multiplexed to better utilize transmission resources. For example, the two demodulation reference signal ports may be code division multiplexed (CDM) or time division multiplexed (TDM). In embodiments where two demodulation reference signal ports are multiplexed with TDM, reference signals formed from different reporting sets may alternate use of the same resource locations, e.g., may use the same resource blocks (RBs) in different time periods or transmit time intervals (TTIs).

In some embodiments, the report is valid for a defined time period. In embodiments where the report is included with a CSI report, the report may only be valid for the validity period of the CSI report. Thus, the base station may receive a new report, determine transmit antenna/beam port pairs for each reporting set in the report, and form new reference signals after each CSI reporting period. In other words, the base station may repeat steps 602-604 and 610-612 periodically. Likewise, the UE may repeat step 606 periodically.

Next, the base station performs transmissions with the selected transmit antenna/beam port pairs from each reporting set (step 614). Data is transmitted according to the demodulation reference signal ports formed for each set. If a reporting set only included one transmit antenna/beam port pair for which a single demodulation reference signal port was formed, then the data is transmitted with a single antenna port. If a reporting set included more than one transmit antenna/beam port pair for which two demodulation reference signal ports were formed, then the data may be encoded and transmitted with the Alamouti algorithm. As discussed above, the demodulation reference signal ports are formed such that none of the transmit antenna/beam port pairs in a set have the same antenna port index. In some embodiments, none of the transmit antenna/beam port pairs across the transmission have the same antenna port index. As such, transmissions performed according to the demodulation reference signal ports formed for each set may be referred to as diverse hybrid beamforming transmissions.

Finally, the UE receives the transmitted data with receive antenna/beam ports that are associated with each reporting set (step 616). As discussed above, each reporting set indicates transmit antenna/beam port pairs for the base station to transmit data on. Because the UE derived the reporting sets during a beam scanning opportunity, the UE therefore knows which receive antenna/beam ports should be used to receive transmissions from the transmit antenna/beam port pairs in each reporting set. Channel estimation is performed for each reporting set using the demodulation reference signal ports configured for each reporting set. If a reporting set indicates one transmit antenna/beam port pair, the UE performs ordinary demodulation and decoding. If a reporting set indicates more than one transmit antenna/beam port pair, the UE demodulates and decodes Alamouti coded data tone pairs.

FIG. 7 illustrates example reporting sets 1 and 2. The reporting sets 1 and 2 are examples of sets in a report transmitted from a UE to a base station after deriving reporting sets for received reference signals. The reporting sets 1 and 2 could be in a same report, or could be in different reports. As noted above, the reporting sets 1 and 2 may be included with a CSI report.

The reporting set 1 is a reporting set that indicates more than one transmit antenna/beam port pair. In particular, the reporting set 1 indicates three transmit antenna/beam port pairs: two with transmit antenna port 0, and one with transmit antenna port 1. When a base station selects transmit antenna/beam port pairs for the reporting set 1, the base station may select transmit antenna port 1/beam port j as a first pair, and then may select a second pair that includes beam transmit antenna port 0. The base station may not select both pairs such that they include transmit antenna port 0 since, as discussed above, diversification of antenna port selection may improve the reliability of hybrid beamforming. Because the reporting set 1 indicates more than one transmit antenna/beam port pair, the base station may form two demodulation reference signal ports with the selected transmit antenna/beam ports and transmit data on them with the Alamouti algorithm.

The reporting set 2 is a reporting set that indicates one transmit antenna/beam port pair. As noted above, the base station may select the only transmit antenna/beam port pair in the reporting set 2, and transmit data with it using one demodulation reference signal port, e.g., transmit antenna port 3/beam port k.

Figure 8:
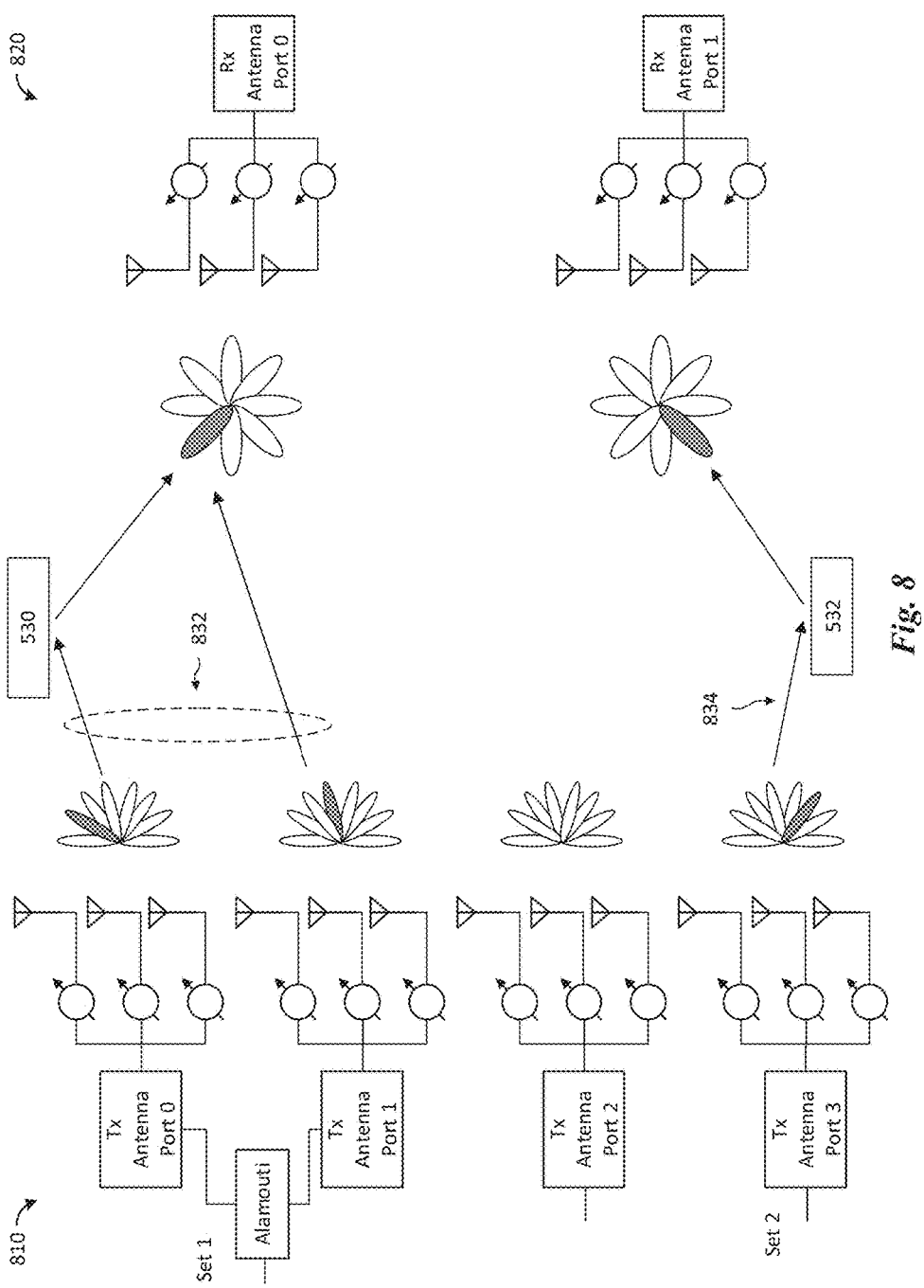
FIG. 8 illustrates a network for transmitting signals with diverse hybrid beamforming.

FIG. 8 illustrates a network for transmitting signals with diverse hybrid beamforming using the reporting sets 1 and 2 from the example above. The network includes a base station 810 and a UE 820. Obstructions 830, 832 are between the base station 810 and the UE 820.

The base station 810 performs transmissions to the UE 820 according to demodulation reference signal ports set up for reporting sets 1 and 2. As noted above, the base station 810 receives the reporting sets 1 and 2 from the UE 820 after a beam scanning opportunity. During the beam scanning opportunity, the UE 820 sequentially receives reference signals with each receive antenna/beam port pair at the UE 820. The UE 820 determines transmit antenna/beam port pairs at the base station 810 that have low interference levels when received with respective receive antenna/beam port pairs at the UE 820. The UE 820 then transmits the reporting sets 1 and 2 to the base station 810.

With respect to reporting set 1, the base station 810 forms a first transmission set 832 using two transmit antenna/beam port pairs selected from reporting set 1. The first pair, transmit antenna port 0/beam port i, is randomly selected, as discussed above with respect to step 610 of FIG. 6. The second pair, transmit antenna port 1/beam port j, is selected such that it does not share transmit antenna port 0 with the first pair. Reference signal ports are the formed with each selected pair. Because two transmit antenna/beam port pairs are selected from reporting set 1, data is transmitted as a pair on this set using the Alamouti algorithm. The UE 820 receives data transmitted from set 1 using the receive beam that it paired with reporting set 1.

With respect to reporting set 2, the base station 810 forms a second transmission set 834 using the only transmit antenna/beam port pair in reporting set 2. A demodulation reference signal port is then formed with the pair. The UE 820 receives data transmitted from set 2 using the receive beam antenna and port that it paired with reporting set 2.

Figure 9:
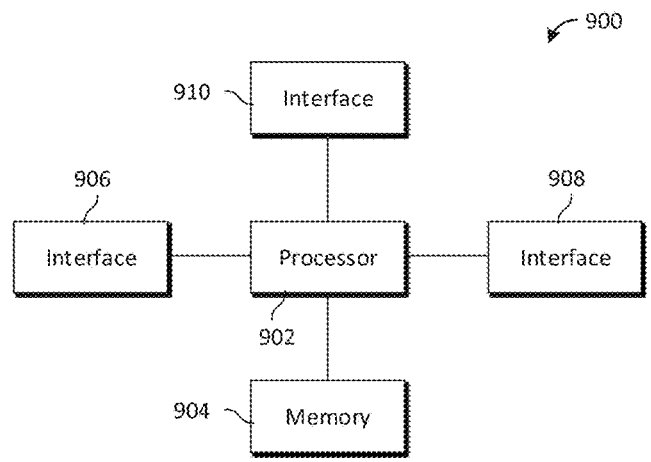
FIG. 9 illustrates a block diagram of an embodiment processing system.

FIG. 9 illustrates a block diagram of an embodiment processing system 900 for performing methods described herein, which may be installed in a host device. As shown, the processing system 900 includes a processor 902, a memory 904, and interfaces 906-910, which may (or may not) be arranged as shown in FIG. 9. The processor 902 may be any component or collection of components adapted to perform computations and/or other processing related tasks, and the memory 904 may be any component or collection of components adapted to store programming and/or instructions for execution by the processor 902. In an embodiment, the memory 904 includes a non-transitory computer readable medium. The interfaces 906, 908, 910 may be any component or collection of components that allow the processing system 900 to communicate with other devices/components and/or a user. For example, one or more of the interfaces 906, 908, 910 may be adapted to communicate data, control, or management messages from the processor 902 to applications installed on the host device and/or a remote device. As another example, one or more of the interfaces 906, 908, 910 may be adapted to allow a user or user device (e.g., personal computer (PC), etc.) to interact/communicate with the processing system 900. The processing system 900 may include additional components not depicted in FIG. 9, such as long term storage (e.g., non-volatile memory, etc.).

In some embodiments, the processing system 900 is included in a network device that is accessing, or part otherwise of, a telecommunications network. In one example, the processing system 900 is in a network-side device in a wireless or wireline telecommunications network, such as a base station, a relay station, a scheduler, a controller, a gateway, a router, an applications server, or any other device in the telecommunications network. In other embodiments, the processing system 900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 10:
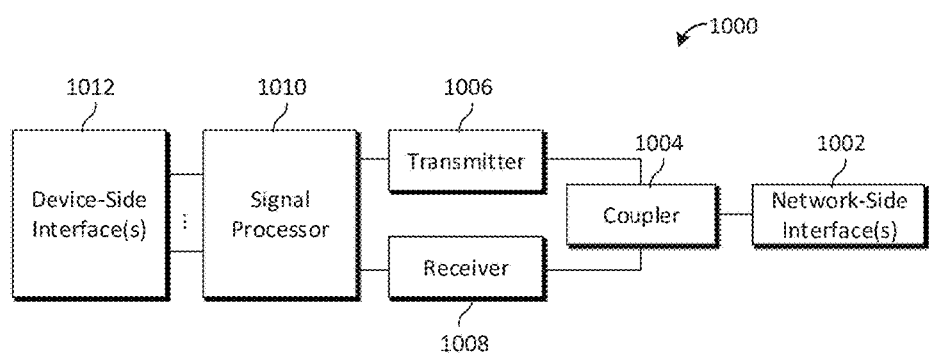
FIG. 10 illustrates a block diagram of a transceiver.

In some embodiments, one or more of the interfaces 906, 908, 910 connects the processing system 900 to a transceiver adapted to transmit and receive signaling over the telecommunications network. FIG. 10 illustrates a block diagram of a transceiver 1000 adapted to transmit and receive signaling over a telecommunications network. The transceiver 1000 may be installed in a host device. As shown, the transceiver 1000 comprises a network-side interface 1002, a coupler 1004, a transmitter 1006, a receiver 1008, a signal processor 1010, and a device-side interface 1012. The network-side interface 1002 may include any component or collection of components adapted to transmit or receive signaling over a wireless or wireline telecommunications network. The coupler 1004 may include any component or collection of components adapted to facilitate bi-directional communication over the network-side interface 1002. The transmitter 1006 may include any component or collection of components (e.g., up-converter, power amplifier, etc.) adapted to convert a baseband signal into a modulated carrier signal suitable for transmission over the network-side interface 1002. The receiver 1008 may include any component or collection of components (e.g., down-converter, low noise amplifier, etc.) adapted to convert a carrier signal received over the network-side interface 1002 into a baseband signal. The signal processor 1010 may include any component or collection of components adapted to convert a baseband signal into a data signal suitable for communication over the device-side interface(s) 1012, or vice-versa. The device-side interface(s) 1012 may include any component or collection of components adapted to communicate data-signals between the signal processor 1010 and components within the host device (e.g., the processing system 900, local area network (LAN) ports, etc.).

The transceiver 1000 may transmit and receive signaling over any type of communications medium. In some embodiments, the transceiver 1000 transmits and receives signaling over a wireless medium. For example, the transceiver 1000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a receiving unit/module, a measuring unit/module, a determining unit/module, a deriving unit/module, a transmitting unit/module, a sending unit/module, a selecting unit/module, and/or an encoding unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method by a UE with one or more receive antenna ports, each of the receive antenna ports associated with a plurality of receive beam ports, the method comprising:
   receiving, by the UE, a reporting configuration from a network indicating configurations of one or more transmit antenna ports, each of the transmit antenna ports associated with a plurality of transmit beam ports, the reporting configuration further indicating a validity period and a plurality of reference signals, each of the reference signals associated with one of the transmit beam ports for the transmit antenna ports;
   receiving, by the UE, a subset of the reference signals;
   measuring, by the UE, receive signal quality for each signal in the subset of the reference signals;
   determining, by the UE, a selected receive beam port for each of the receive antenna ports according to the receive signal quality measured;
   deriving, by the UE, one or more reporting sets, each of the one or more reporting sets corresponding to a respective one of the receive antenna ports, each of the reporting sets indicating one or more selected transmit beam ports the network should use during the validity period, the one or more reporting sets derived according to the receive signal quality measured;
   transmitting, by the UE, the one or more reporting sets to the network;
   detecting, by the UE, a plurality of demodulation reference signals using the selected receive beam ports during the validity period, each of the demodulation reference signals being from one of the selected transmit beam ports;
   receiving, by the UE, a data transmission from the selected transmit beam ports according to the demodulation reference signals during the validity period using the selected receive beam port for each of the receive antenna ports; and
   demodulating and decoding, by the UE, Alamouti-coded data tone pairs received in the data transmission when the one or more reporting sets indicate more than one selected transmit beam port.

2. The method of claim 1, wherein each of the reference signals are scanning reference signals jointly covering a range of spatial directions.

3. The method of claim 1, wherein the one or more transmit antenna ports are located in one or more transmit-receive points (TRPs).

4. The method of claim 1, wherein the reporting configuration is a CSI reporting configuration, and wherein transmitting the one or more reporting sets comprises transmitting a CSI report including the one or more reporting sets.

5. The method of claim 1, wherein the one or more reporting sets indicate each of the selected transmit beam ports according to an index for the selected transmit beam port and an index for the transmit antenna port associated with the selected transmit beam port.

6. The method of claim 1, wherein receiving the data transmission comprises jointly receiving a transmission from the network with the selected receive beam port for each of the receive antenna ports.

7. The method of claim 1, wherein receiving the data transmission according to the demodulation reference signals comprises:
deriving channel estimation for the demodulation reference signals; and
demodulating and decoding the data transmission.

8. The method of claim 7, wherein demodulating and decoding the data transmission comprises demodulating Alamouti coded data tone pairs received in the data transmission with the selected receive beam ports.

9. A method by a network with one or more transmit antenna ports, each of the transmit antenna ports associated with a plurality of transmit beam ports, the method comprising:
sending, by the network, a reporting configuration to a UE indicating configurations of the transmit antenna ports, the reporting configuration further indicating a validity period and a plurality of reference signals, each of the reference signals associated with one of the transmit beam ports for the transmit antenna ports;
transmitting, by the network, the plurality of reference signals;
receiving, by the network, one or more reporting sets from the UE, each of the one or more reporting sets indicating one or more of the transmit beam ports for use during the validity period, wherein the one or more of the transmit beam ports correspond to a receive beam port for the UE;
selecting, by the network, one or more selected transmit beam ports for each one of the reporting sets, each of the selected transmit beam ports having different transmit antenna ports;
transmitting a plurality of demodulation reference signals using the selected transmit beam ports during the validity period; and
transmitting, by the network, data using the selected transmit beam ports according to the transmitted demodulation reference signals during the validity period, wherein transmitting comprises modulating and encoding Alamouti-coded data tone pairs for the data when the one or more received reporting sets indicate more than one selected transmit beam port.

10. The method of claim 9, wherein each of the reference signals are scanning reference signals jointly covering a range of spatial directions.

11. The method of claim 9, wherein the one or more transmit antenna ports are located in one or more transmit-receive points (TRPs).

12. The method of claim 9, wherein the reporting configuration is a CSI reporting configuration, and wherein receiving the one or more reporting sets comprises receiving a CSI report including the one or more reporting sets.

13. The method of claim 12, wherein the CSI reporting configuration indicates a maximum quantity for the one or more reporting sets, and wherein a quantity of reporting sets in the CSI report is less than or equal to the maximum quantity.

14. The method of claim 9, wherein each of the one or more reporting sets indicates the one or more of the transmit beam ports according to indices for the transmit beam ports and indices for the transmit antenna ports associated with the transmit beam ports.

15. The method of claim 9, wherein transmitting the data comprises:
transmitting two demodulation reference signals using the selected transmit beam ports;
encoding the data into Alamouti coded data tone pairs; and
transmitting the Alamouti coded data tone pairs over two of the selected transmit beam ports according to the two demodulation reference signals.

16. The method of claim 9, wherein the demodulation reference signals are one of code division multiplexed or time division multiplexed, and wherein the demodulation reference signals are scrambled with a scrambling sequence.

17. The method of claim 9, wherein selecting the one or more selected transmit beam ports comprises:
selecting one transmit beam port for a first set of the reporting sets in response to the first set indicating one transmit beam port; or
selecting two transmit beam ports for the first set in response to the first set indicating more than one transmit beam port.

18. The method of claim 9, wherein selecting the one or more selected transmit beam ports comprises selecting the transmit beam ports in one or more transmit time intervals (TTIs).

19. The method of claim 18, wherein the TTIs are pre-defined intervals.

20. The method of claim 18, further comprising signaling, by the network, the TTIs to the UE.

21. A user equipment (UE) with one or more receive antenna ports, each of the receive antenna ports associated with a plurality of receive beam ports, the UE comprising:
a processor; and
a non-transitory computer-readable storage medium storing a program to be executed by the processor, the program including instructions to:
receive a reporting configuration from a network indicating configurations of one or more transmit antenna ports, each of the transmit antenna ports associated with a plurality of transmit beam ports, the reporting configuration further indicating a validity period and a plurality of reference signals, each of the reference signals associated with one of the transmit beam ports for the transmit antenna ports;
receive a subset of the reference signals;
measure receive signal quality for each signal in the subset of the reference signals;
determine a selected receive beam port for each of the receive antenna ports according to the receive signal quality measured;
derive one or more reporting sets, each of the one or more reporting sets corresponding to a respective one of the receive antenna ports, each of the reporting sets indicating one or more selected transmit beam ports the network should use during the validity period, the one or more reporting sets derived according to the receive signal quality measured;
transmit the one or more reporting sets to the network;
detect a plurality of demodulation reference signals using the selected receive beam ports during the validity period, each of the demodulation reference signals being from one of the selected transmit beam ports;
receive a data transmission from the selected transmit beam ports according to the demodulation reference signals during the validity period using the selected receive beam port for each of the receive antenna ports; and demodulate and decode Alamouti-coded data tone pairs received in the data transmission when the one or more reporting sets indicate more than one selected transmit beam port.

22. A network with one or more transmit antenna ports, each of the transmit antenna ports associated with a plurality of transmit beam ports, the network comprising:
a processor; and
a non-transitory computer-readable storage medium storing a program to be executed by the processor, the program including instructions to:
send a reporting configuration to a UE indicating configurations of the transmit antenna ports, the reporting configuration further indicating a validity period and a plurality of reference signals, each of the reference signals associated with one of the transmit beam ports for the transmit antenna ports;
transmit the plurality of reference signals;
receive one or more reporting sets from the UE, each of the one or more reporting sets indicating one or more of the transmit beam ports for use during the validity period, wherein the one or more of the transmit beam ports correspond to a receive beam port for the UE;
select one or more selected transmit beam ports for each one of the reporting sets, each of the selected transmit beam ports having different transmit antenna ports;
transmit a plurality of demodulation reference signals using the selected transmit beam ports during the validity period; and
transmit data using the selected transmit beam ports according to the transmitted demodulation reference signals during the validity period, wherein transmitting comprises modulating and encoding Alamouti-coded data tone pairs for the data when the one or more received reporting sets indicate more than one selected transmit beam port.

* * * * *